(12) United States Patent
Qiu et al.

(10) Patent No.: US 12,003,609 B2
(45) Date of Patent: Jun. 4, 2024

(54) DATA FLOW CLASSIFICATION METHOD AND PACKET FORWARDING DEVICE

(71) Applicant: Huawei Technologies Co., Ltd., Shenzhen (CN)

(72) Inventors: Yaping Qiu, Shenzhen (CN); Qi Luo, Nanjing (CN); Zhuojun Hua, Nanjing (CN); Lu Wang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 415 days.

(21) Appl. No.: 17/468,250

(22) Filed: Sep. 7, 2021

(65) Prior Publication Data

US 2021/0409334 A1    Dec. 30, 2021

Related U.S. Application Data

(63) Continuation of application No. PCT/CN2020/087363, filed on Apr. 28, 2020.

(30) Foreign Application Priority Data

May 14, 2019    (CN) .......................... 201910399861.4

(51) Int. Cl.
*H04L 69/22*    (2022.01)
*H04L 43/026*    (2022.01)
(Continued)

(52) U.S. Cl.
CPC ............ *H04L 69/22* (2013.01); *H04L 43/026* (2013.01); *H04L 45/74* (2013.01); *H04L 47/24* (2013.01); *H04L 61/4511* (2022.05)

(58) Field of Classification Search
CPC ....... H04L 69/22; H04L 43/026; H04L 45/74; H04L 47/24; H04L 61/4511; H04L 41/40;
(Continued)

(56) References Cited

U.S. PATENT DOCUMENTS 10,013,291 B1    7/2018  Nielsen et al.
2009/0161547 A1*  6/2009  Riddle .................... G06F 9/526
                                                        370/395.7

(Continued)

FOREIGN PATENT DOCUMENTS

AU    2004201926 A1 *  6/2004  ........... G06F 12/123
CN        103051725 A      4/2013
(Continued)

*Primary Examiner* — Chi H Pham
*Assistant Examiner* — Oladiran Gideon Olaleye
(74) *Attorney, Agent, or Firm* — Conley Rose, P.C.

(57) ABSTRACT

A data flow classification method includes obtaining, by a packet forwarding device, a plurality of data flows, extracting, by the packet forwarding device, address information and time information of each of the data flows, selecting, by the packet forwarding device, a data flow set that is generated when a first client device accesses a plurality of services, determining, by the packet forwarding device, a service set that includes a first service and a second service and that is accessed by the first client device based on the address information of the data flows, determining, by the packet forwarding device, a correlation between services in the service set based on time information of each data flow in the data flow set, and determining, by the packet forwarding device, that the first service and the second service implement a first application.

20 Claims, 3 Drawing Sheets

(51) Int. Cl.
  *H04L 45/74* (2022.01)
  *H04L 47/24* (2022.01)
  *H04L 61/4511* (2022.01)

(58) Field of Classification Search
  CPC . H04L 47/2441; H04L 47/2475; H04L 41/16; H04L 41/5054; G06F 18/23; G06F 18/23213; G06F 18/24
  USPC .......................................................... 370/235
  See application file for complete search history.

(56) References Cited

U.S. PATENT DOCUMENTS

| | | | |
|---|---|---|---|
| 2014/0321290 A1 | 10/2014 | Jin et al. | |
| 2015/0195155 A1 | 7/2015 | Seol et al. | |
| 2016/0080502 A1 * | 3/2016 | Yadav | H04L 12/4633 709/227 |
| 2017/0048155 A1 | 2/2017 | Pan | |
| 2017/0053214 A1 | 2/2017 | Bellala et al. | |
| 2018/0375781 A1 | 12/2018 | Chen et al. | |
| 2019/0222499 A1 | 7/2019 | Chen et al. | |

FOREIGN PATENT DOCUMENTS

| | | | | |
|---|---|---|---|---|
| CN | 103297270 A | | 9/2013 | |
| CN | 107078921 A | * | 8/2017 | ........... G06F 16/285 |
| CN | 107181724 A | | 9/2017 | |
| CN | 107547437 A | | 1/2018 | |
| CN | 107864168 A | | 3/2018 | |
| CN | 109063777 A | | 12/2018 | |
| CN | 109450740 A | * | 3/2019 | ........... G06K 9/6223 |
| CN | 109450740 A | | 3/2019 | |
| CN | 109726735 A | | 5/2019 | |
| CN | 109639481 B | | 10/2020 | |
| FR | 3016108 A1 | * | 7/2015 | ............ H04L 41/00 |
| JP | 2005508593 A | * | 11/2002 | |
| WO | 2016200399 A1 | | 12/2016 | |

* cited by examiner

DATA FLOW CLASSIFICATION METHOD AND PACKET FORWARDING DEVICE

CROSS-REFERENCE TO RELATED APPLICATIONS

This is a continuation of International Patent Application No. PCT/CN2020/087363 filed on Apr. 28, 2020, which claims priority to Chinese Patent Application No. 201910399861.4 filed on May 14, 2019. The disclosures of the aforementioned applications are hereby incorporated by reference in their entireties.

TECHNICAL FIELD

This application relates to the field of communications technologies, and in particular, to a data flow classification method and a packet forwarding device.

BACKGROUND

A plurality of enterprise private applications exists in a software-defined wide area network (SD-WAN) scenario. It is important for network management to identify data of applications carried in network traffic.

A deep packet inspection (DPI) technology is applied to perform application classification on a data flow. In a traffic forwarding process, a DPI device extracts a traffic feature based on byte information in the data flow, and then matches the extracted traffic feature with a preset identification rule, to obtain a classification result.

In a conventional technology, an identification rule used by the DPI device to classify traffic needs to be obtained by a person skilled in the art through summarization, which is time-consuming and labor-intensive.

SUMMARY

Embodiments of this application provide a data flow classification method. The method is applied to a packet forwarding device between an internal network and an internet, to reduce a workload of a skilled person, and avoid a problem that a data flow cannot be identified due to application update.

A first aspect of the embodiments of this application provides a data flow classification method. The method is applied to a packet forwarding device between an internal network and an internet. The method includes the following. The packet forwarding device obtains a plurality of data flows, and extracts address information and time information of each of the plurality of data flows, where the plurality of data flows are data flows generated when a plurality of client devices separately access a plurality of services, the service is used to implement a sub-function of an application, and the address information includes a source Internet Protocol (IP) address, a source port number, a destination IP address, and a destination port number. The packet forwarding device selects, from the plurality of data flows based on the source IP address of each data flow, a data flow set that is generated when a first client device accesses the plurality of services, where the first client device is a client device in the plurality of client devices that is allocated to use a first IP address. The packet forwarding device determines, based on a destination IP address and a destination port number of each data flow in the data flow set, a service set accessed by the first client device, where the service set includes a first service and a second service, and a combination of a destination IP address and a destination port number that correspond to the first service is different from a combination of a destination IP address and a destination port number that correspond to the second service. The packet forwarding device determines a correlation between services in the service set based on time information of each data flow in the data flow set. The packet forwarding device determines, based on the correlation, that the first service and the second service are used to implement a first application. The packet forwarding device determines that data flows corresponding to the first service and the second service are data flows of the first application.

An application includes a group of services, and the service is used to implement a sub-function of the application. When accessing an application, a client device establishes a plurality of data flows with a server of an application provider. The plurality of data flows is used to implement a plurality of services belonging to the application, and time information of the plurality of data flows has a strong correlation. When a plurality of client devices separately accesses one or more applications, a plurality of data flows is established. The packet forwarding device obtains the plurality of data flows. The plurality of data flows are data flows generated when the plurality of client devices accesses a plurality of services. The packet forwarding device extracts address information and time information of each of the plurality of data flows, and may select, from the plurality of data flows based on a source IP address of each data flow, a first data flow set generated by a first client device. The packet forwarding device may determine, based on a destination IP address and a destination port number of each data flow in the data flow set, a service set accessed by the first client device. The packet forwarding device determines, based on time information of each data flow in the data flow set, a correlation between services in the service set. The correlation between each service refers to a correlation degree between services at a time information layer. The packet forwarding device may determine, based on the correlation, a first service and a second service that are used to implement a first application. In this case, the packet forwarding device may determine that data flows corresponding to the first service and the second service are data flows of the first application, thereby classifying the plurality of data flows. According to the data flow classification method provided in this embodiment of this application, classification is performed based on an internal association of the time information without identifying byte information in the data flow according to an identification rule, so that a workload of a skilled person can be reduced, and a problem that a data flow cannot be identified due to application update can be avoided.

In a possible implementation of the first aspect, the time information includes a start moment and/or an end moment of the data flow.

According to the data flow classification method provided in this embodiment of this application, several specific forms of the time information is provided, and may be a start moment, an end moment, or a start moment and an end moment of the data flow. In this way, solution implementation flexibility can be enhanced in a process of classifying the data flows. In addition, data flow classification is completed based on both the start moment and the end moment, which may further improve classification accuracy.

In a possible implementation of the first aspect, that the packet forwarding device determines, based on the correlation, that the first service and the second service are used to implement a first application includes the following. The packet forwarding device performs clustering based on the correlation by using an unsupervised learning algorithm, to determine that the first service and the second service are used to implement the first application.

According to the data flow classification method provided in this embodiment of this application, traffic classification is performed by using the unsupervised learning algorithm in machine learning. In an algorithm development and training process, a label sample does not need to be used, but is merely used to verify validity of the algorithm. This can simplify a classification process and reduce the workload of a skilled person.

In a possible implementation of the first aspect, a method for the clustering includes a spectral clustering algorithm, a K-means clustering algorithm, or a density-based spatial clustering of applications with noise (DBSCAN) density clustering algorithm.

According to the data flow classification method provided in this embodiment of this application, a plurality of possible clustering methods is provided, thereby improving the solution implementation flexibility.

In a possible implementation of the first aspect, that the packet forwarding device determines a correlation between services in the service set based on time information of each data flow in the data flow set includes the following. The packet forwarding device determines a first co-occurrence service set based on the time information of each data flow in the data flow set, where the first service and the second service belong to the first co-occurrence service set, the first co-occurrence service set includes at least two services, and interval duration of time information of data flows generated when the at least two services are accessed is less than or equal to preset duration. The packet forwarding device determines a correlation between the first service and the second service based on the first co-occurrence service set.

According to the data flow classification method provided in this embodiment of this application, a service whose interval duration of time information is less than or equal to the preset duration may be selected from a plurality of services accessed by a single client device, to obtain a co-occurrence service set, and then determine a correlation between services, thereby enhancing implementability of the solution.

In a possible implementation of the first aspect, the method further includes the following. The packet forwarding device determines a similarity between the first service and the second service based on the first co-occurrence service set, to obtain a similarity matrix. That the packet forwarding device determines, based on the correlation, that the first service and the second service are used to implement a first application includes the following. The packet forwarding device determines, based on the similarity matrix, that the first service and the second service are used to implement the first application.

According to the data flow classification method provided in this embodiment of this application, the similarity between the services may be determined by using the co-occurrence service set, to obtain a similarity matrix, and determine, based on the similarity matrix, whether the services are used to implement a same application. This solution can improve classification accuracy.

In a possible implementation of the first aspect, that the packet forwarding device determines a similarity between the first service and the second service based on the first co-occurrence service set includes The packet forwarding device determines the similarity between the first service and the second service based on a cosine similarity calculation method, an intersection over union calculation method, or a Euclidean distance calculation method.

According to the data flow classification method provided in this embodiment of this application, several specific calculation methods for calculating the similarity between the services are provided, thereby improving implementability and flexibility of the solution.

In a possible implementation of the first aspect, the method further includes the following. The packet forwarding device extracts a first feature vector of the first service and a second feature vector of the second service from the similarity matrix by using a graph embedding technology. That the packet forwarding device determines, based on the correlation, that the first service and the second service are used to implement a first application includes the following. The packet forwarding device determines, based on the first feature vector and the second feature vector, that the first service and the second service are used to implement the first application.

According to the data flow classification method provided in this embodiment of this application, after the similarity matrix is obtained, a feature vector of a service may be further extracted by using the graph embedding technology, to determine, based on the feature vector, services used to implement a same application, thereby improving classification accuracy.

In a possible implementation of the first aspect, the method further includes the following. The packet forwarding device extracts Domain Name System (DNS) features of the plurality of data flows, where the DNS feature includes a correspondence between a domain name, and the combination of the destination IP address and the destination port number. The packet forwarding device determines a label of the first application based on destination address information of the data flow of the first application and the DNS features, where the label is used to identify the first application.

According to the data flow classification method provided in this embodiment of this application, the packet forwarding device may further obtain a DNS feature of a data flow, and identify, by using the DNS feature, an application corresponding to the classified data flow, so that a user can intuitively understand an application type.

A second aspect of the embodiments of this application provides a packet forwarding device. The packet forwarding device is used between an internal network and an internet. The packet forwarding device includes an obtaining unit configured to obtain a plurality of data flows, and extract address information and time information of each of the plurality of data flows, where the plurality of data flows are data flows generated when a plurality of client devices access a plurality of services, the service is used to implement a sub-function of an application, and the address information includes a source IP address, a source port number, a destination IP address, and a destination port number, a selection unit configured to select, from the plurality of data flows based on the source IP address of each data flow, a data flow set that is generated when a first client device accesses the plurality of services, where the first client device is a client device in the plurality of client devices that is allocated to use a first IP address, and a determining unit configured to determine, based on a destination IP address and a destination port number of each data flow in the data flow set, a service set accessed by the first client device, where the service set includes a first service and a second service, and a combination of destination IP address and a destination port number that correspond to the first service is different from a combination of a destination IP address and a destination port number that correspond to the second service. The determining unit is further configured to determine a correlation between services in the service set based on time information of each data flow in the data flow set. The determining unit is further configured to determine, based on the correlation, that the first service and the second service are used to implement a first application. The determining unit is further configured to determine that data flows corresponding to the first service and the second service are data flows of the first application.

In a possible implementation of the second aspect, the determining unit is further configured to perform clustering based on the correlation by using an unsupervised learning algorithm, to determine that the first service and the second service are used to implement the first application.

In a possible implementation of the second aspect, the determining unit is further configured to determine a first co-occurrence service set based on the time information of each data flow in the data flow set, where the first service and the second service belong to the first co-occurrence service set, the first co-occurrence service set includes at least two services, and interval duration of time information of data flows generated when the at least two services are accessed is less than or equal to preset duration, and determine a correlation between the first service and the second service based on the first co-occurrence service set.

In a possible implementation of the second aspect, the determining unit is further configured to determine a similarity between the first service and the second service based on the first co-occurrence service set, to obtain a similarity matrix. The determining unit is further configured to determine, based on the similarity matrix, that the first service and the second service are used to implement the first application.

In a possible implementation of the second aspect, the determining unit is further configured to determine the similarity between the first service and the second service based on a cosine similarity calculation method, an intersection over union calculation method, or a Euclidean distance calculation method.

In a possible implementation of the second aspect, the device further includes an extraction unit configured to extract a first feature vector of the first service and a second feature vector of the second service from the similarity matrix by using a graph embedding technology. The determining unit is further configured to determine, based on the first feature vector and the second feature vector, that the first service and the second service are used to implement the first application.

In a possible implementation of the second aspect, the extraction unit is further configured to extract DNS features of the plurality of data flows, where the DNS feature includes a correspondence between a domain name, and the combination of the destination IP address and the destination port number. The determining unit is further configured to determine a label of the first application based on destination address information of the data flow of the first application and the DNS features, where the label is used to identify the first application.

A third aspect of the embodiments of this application provides a packet forwarding device. The packet forwarding device is used between an internal network and an internet and includes a processor and a network interface. The network interface is configured to receive and send data. The processor is configured to perform the method in the first aspect and the implementations of the first aspect.

A fourth aspect of the embodiments of this application provides a computer program product. The computer program product includes instructions, and when the instructions are run on a computer, the computer is enabled to perform the method in the first aspect and the implementations of the first aspect.

A fifth aspect of the embodiments of this application provides a computer-readable storage medium. The computer-readable storage medium stores instructions, and when the instructions are run on a computer, the method in the first aspect and the implementations of the first aspect in the embodiments of this application is performed.

A sixth aspect of the embodiments of this application provides a communications system. The communications system includes the packet forwarding device in the second aspect.

It can be learned from the foregoing technical solutions that the embodiments of this application have the following advantages.

The embodiments of this application provide the data flow classification method. The method is applied to the packet forwarding device between the internal network and the internet. The application usually includes the group of services. To implement sub-functions of the application, the plurality of clients accesses the application. That is, a large quantity of data flows is generated when the plurality of services is accessed. First, the packet forwarding device extracts source address information, destination address information, and the time information of the plurality of data flows. The plurality of client devices includes the first client device. The packet forwarding device may select, based on the source address information, the data flow set generated when the first client device accesses the plurality of services. The packet forwarding device may determine, based on the destination address information, the service set accessed by the first client device. The service set includes the first service and the second service. The packet forwarding device determines the correlation between the services in the service set based on the time information of the data flow set. The packet forwarding device determines, based on the correlation, that the first service and the second service are used to implement the first application. The packet forwarding device determines that the data flows corresponding to the first service and the second service are the data flows of the first application. In this case, the packet forwarding device may implement application classification based on the source address information, the destination address information, and the time information of the data flows. Compared with obtaining the identification rule through summarization by the skilled person, in this application the workload of the skilled person can be reduced and application classification can be quickly and conveniently completed.

DESCRIPTION OF EMBODIMENTS

Distinguishing or identifying data flows in aggregated traffic that belong to different applications facilitates network management. For example, different service guarantees are provided for traffic of the different applications.

Generally, a DPI technology is used to perform application classification on data flows. In a traffic forwarding process, a DPI device extracts a traffic feature based on byte information in the data flow, and then matches the extracted traffic feature with a preset identification rule to obtain a classification result. The identification rule used by the DPI device to classify traffic needs to be obtained by a skilled person through summarization. This is time-consuming and labor-intensive, and it is difficult to avoid a problem that the data flow cannot be identified due to application update. In addition, because the traffic feature is extracted based on the byte information in the data flow, it is difficult to extract a traffic feature of an encrypted packet.

Therefore, embodiments of this application provide a data flow classification method. The method is used to classify data flows belonging to the different applications, to reduce a workload of the skilled person, and avoid the problem that the data flow cannot be identified due to the application update.

The data flow classification method provided in the embodiments of this application may be applied to a plurality of internal networks, such as an enterprise network or a campus network. A specific application scenario is not limited in this application. The following provides descriptions by using an example in which a data flow classification method is applied to an SD-WAN.

Figure 1:
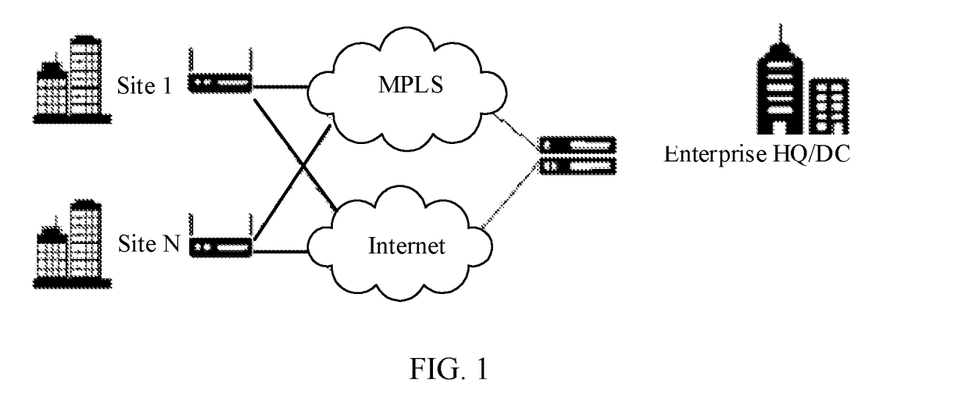
FIG. 1 is an architectural diagram of an SD-WAN network according to an embodiment of this application.

FIG. 1 is an architectural diagram of an SD-WAN network according to an embodiment of this application. The SD-WAN is a service formed by applying a software-defined network (SDN) technology to a wide area network scenario. An SDN uses a virtualization technology to simplify management, and operation and maintenance. In an SD-WAN scenario, there are many enterprise private applications. A customer expects to implement quality of service (QoS) assurance and traffic visualization for traffic of these applications, to facilitate network management.

In an SD-WAN solution, network devices at enterprise branches (such as a site 1 and a site N in the figure) form branch sites, and network devices at an enterprise headquarter (HQ) or a data center (DC) form a headquarter site. A dynamic smart virtual private network (DSVPN) tunnel is used for interconnection between the branch sites and the headquarter site or between the branch sites. A logical link type corresponding to the DSVPN tunnel may be an internet, Multiprotocol Label Switching (MPLS), Long-Term Evolution (LTE), or the like.

According to the data flow classification method provided in the embodiments of this application, a node identifying traffic is a packet forwarding device between an internal network and an internet, for example, a router.

Figure 2:
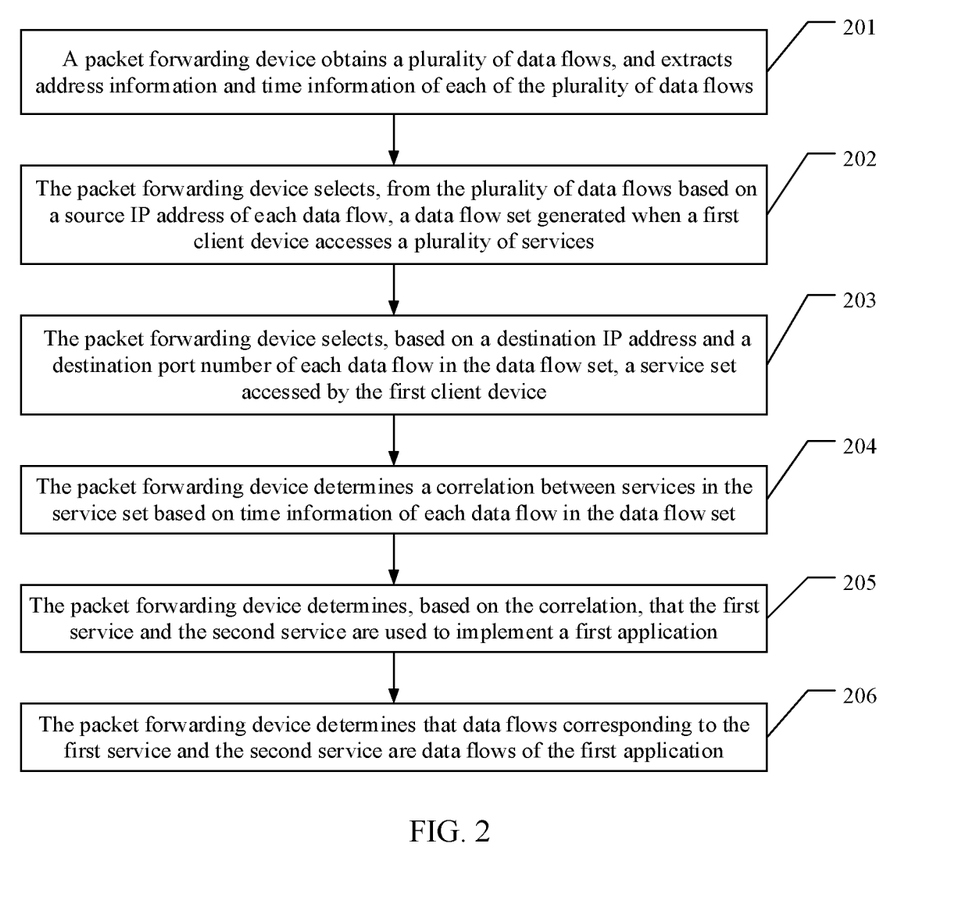
FIG. 2 is a schematic diagram of an embodiment of a data flow classification method according to embodiments of this application.

Based on the architecture shown in FIG. 1, refer to FIG. 2. FIG. 2 is a schematic diagram of an embodiment of a data flow classification method according to the embodiments of this application.

An application includes a group of services, where the service is used to implement a sub-function of the application. When accessing an application, a client device establishes a plurality of data flows with a plurality of services that belong to the application. Time information of the plurality of data flows has a strong correlation. When application access behaviors of a plurality of client devices are considered, data flows having a time information correlation can be more accurately determined at a statistical level.

201: A packet forwarding device obtains a plurality of data flows, and extracts address information and time information of each of the plurality of data flows.

When the plurality of client devices separately accesses one or more applications, the plurality of data flows is established. An application includes a plurality of services. In this embodiment, the packet forwarding device obtains the plurality of data flows, and the plurality of data flows are data flows generated when the plurality of client devices separately accesses the plurality of services. In this embodiment of this application, a data flow forwarded by the packet forwarding device in a time period may be obtained. Duration of the time period may be 12 hours, 24 hours, or the like. Specific duration is not limited herein.

The packet forwarding device extracts the address information and the time information of each of the plurality of data flows.

The address information includes a source IP address, a source port number, a destination IP address, and a destination port number. A combination of the destination IP address and the destination port number may be used to identify a service accessed by the data flow. Optionally, the address information is a flow 5-tuple, to be specific, an IP address, a source port number, a destination IP address, destination port number, and a transmission protocol.

The time information refers to a start moment and/or an end moment of the data flow.

Optionally, for a data flow sent based on a Transmission Control Protocol (TCP), a start moment may be a moment at which a synchronize (SYN) packet is sent, and an end moment may be a moment at which a finish (FIN) packet is sent. For a data flow sent based on a User Datagram Protocol (UDP), a start moment of the data flow is a moment at which a UDP packet is received. After receiving the UDP packet, the packet forwarding device establishes a forwarding table. An aging time of the forwarding table is usually 120 seconds (s). To be specific, if no data flow matches the forwarding table within 120 s, the entry ages (is deleted). An end moment of the data flow is a moment at which the last packet matches the forwarding table. Therefore, the end moment may be the moment at which the forwarding table ages minus 120 s. Certainly, 120 s is only an example of an aging time of the forwarding table. The aging time of the forwarding table of the packet forwarding device may be configured by an administrator based on a specific network scenario, or may be updated in a self-learning manner.

202: The packet forwarding device selects, from the plurality of data flows based on a source IP address of each data flow, a data flow set generated when a first client device accesses a plurality of services.

After extracting the address information of each of the plurality of data flows, the packet forwarding device may select, from the plurality of data flows based on the source IP address in the address information of the data flows, the data flow set generated when the first client device accesses the plurality of services. The first client device is a client device in the plurality of client devices that is allocated to use a first IP address. The packet forwarding device may select, from data flows whose source IP addresses are the first IP address, the data flow set generated when the first client device accesses the plurality of services.

Optionally, the packet forwarding device may determine, based on different source IP addresses, the plurality of data flows obtained in step 201 as a data flow set corresponding to each of the plurality of client devices. This is not limited herein.

203: The packet forwarding device selects, based on the destination IP address and the destination port number of each data flow in the data flow set, a service set accessed by the first client device.

The combination of the destination IP address and the destination port number may be used to identify a service accessed by the data flow. The packet forwarding device determines, based on the destination IP address and the destination port number in the address information of the data flow, a service accessed by each data flow. The packet forwarding device determines the service set accessed by the first client device. The service set includes a first service and a second service, and a combination of a destination IP address and a destination port number that correspond to the first service is different from a combination of a destination IP address and a destination port number that correspond to the second service.

Optionally, the packet forwarding device may determine a service set corresponding to a data flow set of each of the plurality of client devices. This is not limited herein.

204: The packet forwarding device determines a correlation between services in the service set based on time information of each data flow in the data flow set.

Based on step 202 and step 203, the packet forwarding device obtains the data flow set established by the first client device and the service set accessed by the first client device. The packet forwarding device may obtain, based on the time information of the data flow, time information of each service in the service set accessed by the first client device.

The correlation between services in the service set refers to a correlation degree between services at a time information level.

Optionally, when accessing an application, the first client device establishes a data flow with the group of services. Therefore, a correlation exists between start moments of establishing data flows with the group of services. For example, a time interval between start moments of data flows corresponding to the service set is less than a preset first duration threshold. The first duration threshold is an empirical value determined based on a network condition in an actual application, and may be 30 s, 25 s, or the like. This is not limited herein. Likewise, a second duration threshold may further appear in the following embodiment, and the second duration threshold is also an empirical value determined based on the network condition. The "first" and the "second" are merely used for differentiation. In the actual application, physical values may be the same or may be different. If the packet forwarding device determines, based on a start moment of each data flow in the data flow set, that a time interval between start moments of the first service and the second service in the service set are less than the first duration threshold, the first service is correlated to the second service. Otherwise, the first service is uncorrelated to the second service.

Optionally, when the first client device stops accessing the application, a correlation exists between an end moment of establishing the data flow with the group of services. For example, a time interval between end moments of the plurality of data flows corresponding to the service set shall be also less than the preset second duration threshold. If the packet forwarding device determines, based on the end moment of each data flow in the data flow set, that a time interval between end moments of the first service and the second service in the service set are less than the second duration threshold, the first service is correlated to the second service. Otherwise, the first service is not correlated to the second service.

Optionally, the time information may be the start moment and the end moment of the data flow. It may be understood that if a time interval between start moments of data flows corresponding to two services in the service set is less than the preset first duration threshold, and a time interval between end moments is less than the preset second duration threshold, it may be more accurately determined that the first service is correlated to the second service.

205: The packet forwarding device, based on the correlation, that the first service and the second service are used to implement a first application.

Based on a determining result of the correlation between services in the service set in step 204, the packet forwarding device may determine that the first service and the second service that are in the service set and that are correlated are services for implementing the first application. Optionally, a third service that is not correlated with the first service and the second service is a service used to implement a second application. Optionally, if the first service, the second service, and a fourth service are correlated, it may be determined that the first service, the second service, and the fourth service are services used to implement the first application.

206: The packet forwarding device determines that data flows corresponding to the first service and the second service are data flows of the first application.

After determining that the first service and the second service are used to implement the first application, the packet forwarding device determines that the data flows corresponding to the first service and the second service are the data flows of the first application.

Therefore, the packet forwarding device obtains the plurality of data flows, extracts the address information and the time information of each of the plurality of data flows, further determines the data flow set generated when the first client device accesses the service set, determines, based on the correlation between services in the service set, the first service and the second service that belong to the first application, and then determines that the data flows accessing the first service and the second service are the data flows of the first application, to classify the data flows. According to the data flow classification method provided in the embodiments of this application, classification is performed based on an internal association of the time information without identifying byte information in the data flow according to an identification rule, so that a workload of a skilled person can be reduced, and a problem that the data flow cannot be identified due to application update can be avoided.

Figure 3:
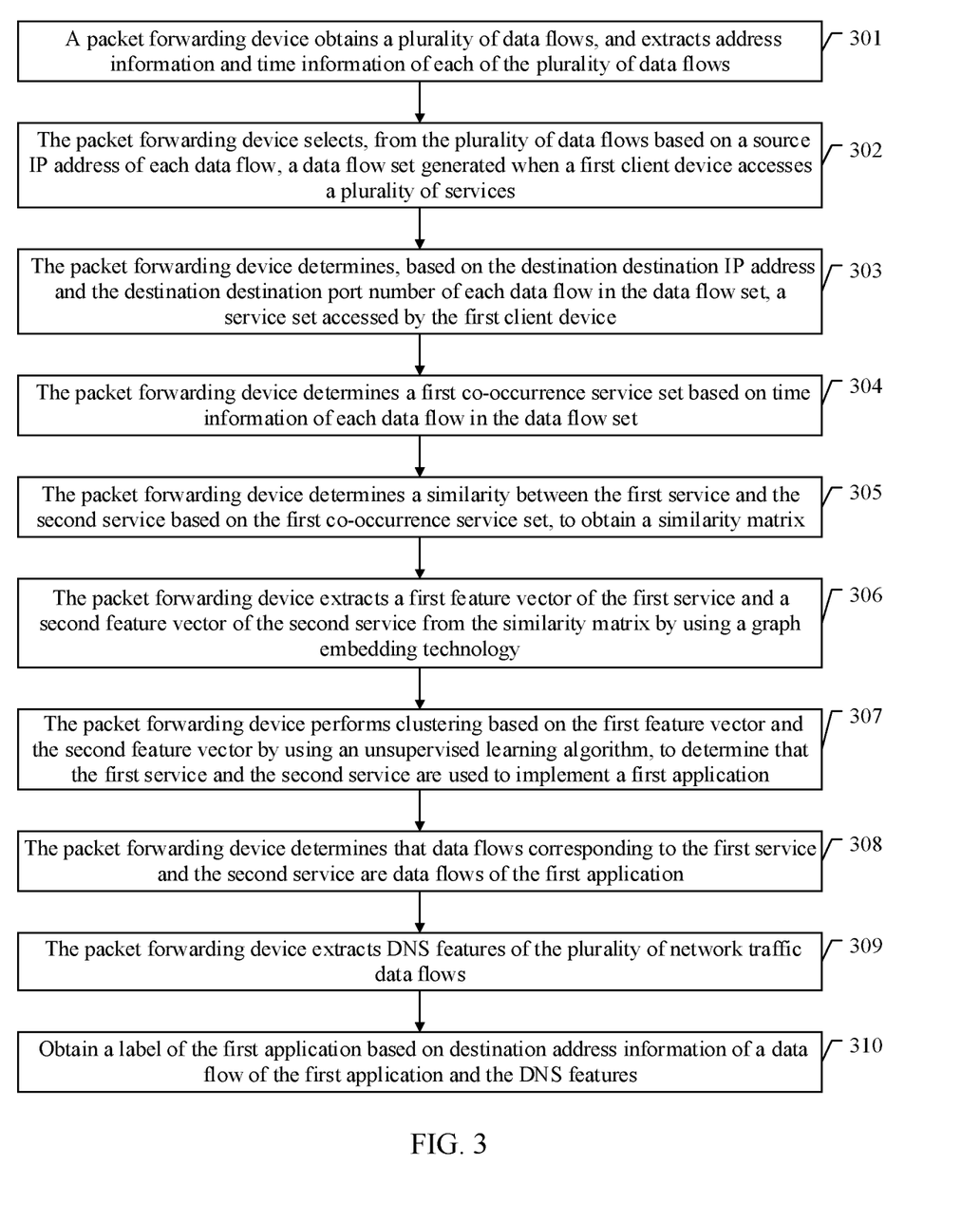
FIG. 3 is a schematic diagram of another embodiment of a data flow classification method according to embodiments of this application.

Based on the architecture shown in FIG. 1, refer to FIG. 3. FIG. 3 is another schematic diagram of an embodiment of a data flow classification method according to this embodiment of this application.

301: A packet forwarding device obtains a plurality of data flows, and extracts address information and time information of each of the plurality of data flows.

When a plurality of client devices separately accesses one or more applications, the plurality of data flows is established. An application includes a plurality of services. In this embodiment, the packet forwarding device obtains the plurality of data flows, and the plurality of data flows are data flows generated when the plurality of client devices separately accesses the plurality of services. In this embodiment of this application, a data flow forwarded by the packet forwarding device in a time period may be obtained. Duration of the time period may be 12 hours, 24 hours, or the like. Specific duration is not limited herein.

The packet forwarding device extracts the address information and the time information of each of the plurality of data flows.

The address information includes a source IP address, a source port number, a destination IP address, and a destination port number. Optionally, the address information is a flow 5-tuple. To be specific, a source IP address, a source port number, a destination IP address, a destination port number, and a transmission protocol.

The time information refers to a start moment and/or an end moment of the data flow.

For a data flow sent based on a TCP protocol, a start moment of the data flow is a moment at which a SYN packet is sent, and an end moment of the data flow is a moment at which a FIN packet is sent. For a data flow sent based on a UDP protocol, a start moment of the data flow is a moment at which a UDP packet is received. After receiving the UDP packet, the packet forwarding device establishes a forwarding table. After receiving the UDP packet, the packet forwarding device establishes a forwarding table. An aging time of the forwarding table is usually 120 s. To be specific, if no data flow matches the forwarding table within 120 s, the entry ages and is deleted. An end moment of the data flow is a moment at which the last packet matches the forwarding table. Therefore, the end moment may be the moment at which the forwarding table ages and is deleted minus 120 s. Certainly, 120 s is only an example of an aging time of the forwarding table. The aging time of the forwarding table of the packet forwarding device may be configured by an administrator based on a specific network scenario, or may be updated in a self-learning manner.

302: The packet forwarding device selects, from the plurality of data flows based on a source IP address of each data flow, a first data flow set generated when a first client device accesses a plurality of services.

After extracting the address information of each of the plurality of data flows, the packet forwarding device may select, from the plurality of data flows based on the source IP address in the address information of the data flows, the first data flow set generated when the first client device accesses the plurality of services. The first client device is a client device in the plurality of client devices that is allocated to use a first IP address. The packet forwarding device may select, from data flows whose source IP addresses are the first IP address, the first data flow set generated when the first client device accesses the plurality of services.

For example, refer to the following table, which is a data flow table of the first client device.

TABLE 1

| Client (source IP address and source port number) | Service (destination IP address and destination port number) | Start moment of a data flow |
|---|---|---|
| srcIP1:srcPORT1 | dstIP1:dstPORT1($S_1$) | T1 |
| srcIP1:srcPORT2 | dstIP1:dstPORT2($S_2$) | T2 |
| srcIP1:srcPORT3 | dstIP1:dstPORT3($S_3$) | T3 |
| ... | | |
| srcIP1:srcPORTn | dstIPn:dstPORTn($S_n$) | Tn |

Each row in the table represents address information and time information of a data flow. The first column is address information of the client device, to be specific, a source IP address (srcIP) and a source port number (srcPORT). The srcIP1 represents the first IP address, and corresponds to the first client device. Different data flows may correspond to different source port numbers, and are differentiated by using the srcPORT 1 to the srcPORT n in the table. The second column represents a destination IP address and a destination port number of the data flow. A combination of the destination IP address (dstIP) and the destination port number (dstPORT) can be used to identify a service. The different data flows may access different services, and are differentiated by using the S1 to the Sn in the table. The third column is a start moment of the data flow. The different data flows correspond to different start moments, and are differentiated by using the T1 to the Tn in the table. Optionally, the data flow table of the first client device may be arranged based on a time sequence of start moments of the data flow.

Optionally, the packet forwarding device may determine, based on different source IP addresses, the plurality of data flows obtained in step 201 as a data flow set generated when each of the plurality of client devices accesses the services. This is not limited herein. For example, the packet forwarding device determines a second data flow set generated when a second client device accesses the plurality of services.

303: The packet forwarding device determines, based on the destination IP address and the destination port number of each data flow in the data flow set, a service set accessed by the first client device.

The combination of the destination IP address and the destination port number may be used to identify a service accessed by the data flow. The packet forwarding device determines, based on the destination IP address and the destination port number in the address information of the data flow, a service accessed by each data flow. The packet forwarding device determines the first service set accessed by the first client device. The first service set includes a first service and a second service, and a combination of a destination IP address and a destination port number that correspond to the first service is different from a combination of a destination IP address and a destination port number that correspond to the second service.

For example, the first service set accessed by the first client device is ($S_1$, $S_2$, . . . , $S_n$).

Optionally, the packet forwarding device may determine a service set corresponding to the data flow set of each of the plurality of client devices. This is not limited herein. For example, the packet forwarding device determines a second data flow set accessed by the second client device.

304: The packet forwarding device determines a first co-occurrence service set based on the time information of each data flow in the data flow set.

The packet forwarding device may obtain time information of each service in the service set accessed by the first client device, and determine the first co-occurrence service set based on the time information of each service. The first co-occurrence service set includes the first service and the second service. The first co-occurrence service set includes at least two services, and interval duration of time information of data flows generated when the at least two services are accessed is less than or equal to preset duration.

Optionally, the packet forwarding device may obtain, based on a time window sliding method, a data flow whose interval duration of time information is less than or equal to the preset duration. For example, refer to Table 1. If the first data flow set is arranged in chronological order of start moments of data flows, a time window that starts from T1 and whose duration is w is selected. w is an empirical value determined based on a network condition in an actual application, and may be 30 s, 25 s, or the like. This is not limited herein. It is determined whether there is a data flow in the time window, in other words, whether there is a data flow in a time period from T1 to T1+w. If there is the data flow in the time period from T1 to T1+w, the time window is slid backward by a length of w. In other words, it is determined whether there is a data flow in a time period from T1+w to T1+2w. If there is the data flow in a time period from T1+w to T1+2w, the foregoing steps continue to be performed. If no data flow appears, an end moment of the time window is recorded as T1+$\lambda_1$w, where $\lambda 1$ is an integer, and T1+$\lambda_1$w is less than or equal to Tn. In this case, a service identified by a data flow corresponding to T1 actually appears independently. A set formed by services corresponding to data flows whose start moments are within a time period from T1 to T1+$\lambda_1$w is selected, and is denoted as a first co-occurrence service set S. It is assumed that the S includes a first service $S_1$ and a second service $S_2$. It may be understood that, interval duration between start moments of data flows generated by the $S_1$ and the $S_2$ is less than or equal to w. Optionally, to describe a correlation between the plurality of services more clearly, the correlation may be maintained by using a data structure, for example, a two-dimensional table. The two-dimensional table is referred to as a co-occurrence service frequency table. Refer to Table 2.

TABLE 2

|  | $S_1$ | $S_2$ | $S_3$ | ... | $S_n$ |
|---|---|---|---|---|---|
| $S_1$ | 1 | 1 | 0 | 0 | 0 |
| $S_2$ | 1 | 1 | 0 | 0 | 0 |
| $S_3$ | 0 | 0 | 0 | 0 | 0 |
| ... | | | | | |
| $S_n$ | 0 | 0 | 0 | 0 | 0 |

Then, from an end moment (for example, T1+$\lambda_1$w) of a previous time window, a start moment of a flow closest to the end moment (T1+$\lambda_1$w) is found as a start point of a new time window, the foregoing similar sliding time window analysis is performed again, and the co-occurrence service frequency table and a quantity of times that each service appears independently are updated until analysis of the data flow table of the first client shown in Table 1 is completed.

The following uses an example to describe a method for maintaining the co-occurrence service frequency table. The obtained first co-occurrence service set S includes $S_1$ and $S_2$. Because $S_1$ and $S_2$ each appear once, 1 is recorded in ($S_1$, $S_1$) of the table. Similarly, 1 is also recorded in ($S_2$, $S_2$). Because $S_1$ and $S_2$ appear in the first co-occurrence service set at the same time, 1 is also recorded in ($S_1$, $S_2$) and ($S_2$, $S_1$) separately.

Optionally, similar analysis is also performed on another client except the first client, for example, the second client, by using a same time window size, to be specific, the foregoing step 302 to step 304 are repeatedly performed, and the co-occurrence service frequency table shown in Table 2 and the quantity of times that each service appears independently are updated. In other words, if the packet forwarding device obtains a second co-occurrence service set of the second client device, the packet forwarding device may also accumulate and update data in the co-occurrence service frequency table based on the foregoing method.

305: The packet forwarding device determines a similarity between the first service and the second service based on the first co-occurrence service set, to obtain a similarity matrix.

The packet forwarding device determines the similarity between the first service and the second service based on the first co-occurrence service set, to obtain the similarity matrix. The packet forwarding device determines a correlation between the first service and the second service based on the similarity matrix.

Optionally, the packet forwarding device calculates a similarity between the services based on the co-occurrence service frequency table obtained in step 304. Table 2 is represented by using a matrix $\Gamma$, and a size of the matrix is $M_s \times M_s$. Ms is a total quantity of services that appear in the data flow set, and data $\Gamma_{ij}$ in the $i^{th}$ row and the $j^{th}$ column represents a quantity of co-occurrences of the $i^{th}$ service and the $j^{th}$ service. A similarity between the $i^{th}$ service and the $j^{th}$ service is denoted as $\varepsilon_{ij}$. There are a plurality of methods for calculating the similarity. Optionally, the packet forwarding device may determine the similarity between the services based on a cosine similarity calculation method, an intersection over union calculation method, or a Euclidean distance calculation method.

Optionally, the packet forwarding device calculates the similarity between the services based on the co-occurrence service frequency table obtained in step 304 and the quantity of the times that each service appears independently. If a service appears independently, actually, it means a quantity of times that the service appears together with other services is 0.

Details are as follows.

For a method for calculating the similarity between the $i^{th}$ service and the $j^{th}$ service based on the cosine similarity, refer to formula (1):

$$\varepsilon_{ij} = \cos\frac{\Gamma_i \cdot \Gamma_j}{|\Gamma_i||\Gamma_j|}. \quad (1)$$

The $\varepsilon_{ij}$ represents the similarity between the $i^{th}$ service and the $j^{th}$ service, $\Gamma_1$ represents the $i^{th}$ row of the matrix, $\Gamma_j$ represents the $j^{th}$ row of the matrix, |·| represents infinite norm calculation, and · represents vector inner product.

Calculation based on the intersection over union method is shown in formula (2):

$$\varepsilon_{ij} = \frac{\Gamma_{ij}}{N_i + N_j}. \quad (2)$$

The $\varepsilon_{ij}$ represents the similarity between the $i^{th}$ service and the $j^{th}$ service, and $\Gamma_{ij}$ represents a quantity of co-occurrences of the $i^{th}$ service and the $j^{th}$ service, that is, data in the $i^{th}$ row and the $j^{th}$ column in Table 2. Ni represents a total quantity of times that the $i^{th}$ service appears, that is, data in the $i^{th}$ row and the $i^{th}$ column in Table 2.

The calculation based on the Euclidean distance method is shown in formula (3):

$$\varepsilon_{ij} = dist(\Gamma_i, \Gamma_j) = ((\Gamma_{i1} - \Gamma_{j1})^2 + (\Gamma_{i2} - \Gamma_{j2})^2 + \ldots + (\Gamma_{iM_s} - \Gamma_{jM_s})^2)^{\frac{1}{2}}. \quad (3)$$

The $\varepsilon_{ij}$ represents the similarity between the $i^{th}$ service and the $j^{th}$ service, dist($\Gamma_i,\Gamma_j$) represents a distance between $\Gamma_i$ and $\Gamma_j$, and $\Gamma_{ij}$ represents the quantity of co-occurrences of the $i^{th}$ service and the $j^{th}$ service, that is, the data in the $i^{th}$ row and the $j^{th}$ column in Table 2. $M_s$ represents a total quantity of times of the services in the data flow set.

The packet forwarding device may obtain a similarity matrix E based on a similarity between any two services in the first co-occurrence service set.

306: The packet forwarding device extracts a first feature vector of the first service and a second feature vector of the second service from the similarity matrix by using a graph embedding technology.

The similarity matrix E can be considered as an adjacency matrix of a graph formed by the services. A node in the graph is a service, and a connection weight of an edge is a value of the adjacency matrix. The graph embedding technology is to represent nodes in the graph as a dense vector based on a connection relationship, namely, the adjacency matrix, between the nodes in the graph, to further extract a feature vector of each service. The packet forwarding device extracts the first feature vector of the first service and the second feature vector of the second service from the similarity matrix by using the graph embedding technology.

It should be noted that step 306 is an optional step and may be performed or may not be performed. This is not limited herein.

307: The packet forwarding device performs clustering based on the first feature vector and the second feature vector by using an unsupervised learning algorithm, to determine that the first service and the second service are used to implement a first application.

The packet forwarding device performs application clustering based on the first feature vector and the second feature vector, to determine that the first service and the second service are used to implement the first application. Optionally, a method for applying the application clustering is the unsupervised learning algorithm, for example, a spectral clustering algorithm, a K-means clustering algorithm, or a DBSCAN density clustering algorithm. This is not limited herein.

It should be noted that if step 306 is not performed, the packet forwarding device may directly perform the clustering based on the similarity matrix by using the unsupervised learning algorithm, to determine that the first service and the second service are used to implement the first application.

308: The packet forwarding device determines that data flows corresponding to the first service and the second service are data flows of the first application.

After determining that the first service and the second service are used to implement the first application, the packet forwarding device may determine that the data flows corresponding to the first service and the second service are the data flows of the first application.

309: The packet forwarding device extracts DNS features of the plurality of network traffic data flows.

The packet forwarding device extracts the DNS features of the plurality of data flows. The DNS feature includes a correspondence between a domain name, and the combination of the destination IP address and the destination port number.

It should be noted that step 309 may be performed before any one of step 302 to step 308. This is not limited herein.

For example, that the packet forwarding device extracts a DNS feature of a network traffic data flow includes a DNS domain name corresponding to the first service is iLearning.huawei.com.

310: Obtain a label of the first application based on destination address information of the data flow of the first application and the DNS features.

The packet forwarding device extracts the DNS features of the plurality of data flows. The DNS feature includes the correspondence between the domain name, and the combination of the destination IP address and the destination port number. The packet forwarding device obtains the label of the first application based on the destination address information of the data flow of the first application and the DNS features. The label is used to identify the first application.

For example, the packet forwarding device determines that the first service and the second service belong to the first application, and may determine, based on a DNS feature of the data flow corresponding to the first service, that the DNS domain name corresponding to the first service is iLearning.huawei.com. The packet forwarding device may use related information in the DNS domain name as the label of the first application, for example, "iLearning". It may be understood that a DNS domain name corresponding to the second service may also be used to determine the label of the first application. This is not limited herein.

Figure 4:
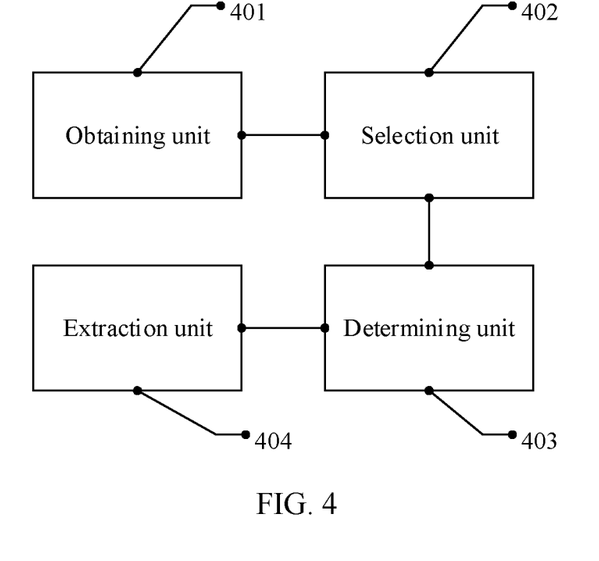
FIG. 4 is a schematic diagram of an embodiment of a packet forwarding according to embodiments of this application.

The foregoing describes the data flow classification method, and the following describes a packet forwarding device for implementing the data flow classification method. FIG. 4 is a schematic diagram of an embodiment of a packet forwarding device according to the embodiments of this application.

The packet forwarding device provided in this embodiment of this application is used between an internal network and an internet, and includes an obtaining unit 401 configured to obtain a plurality of data flows, and extract address information and time information of each of the plurality of data flows, where the plurality of data flows are data flows generated when a plurality of client devices separately access a plurality of services, the service is used to implement a sub-function of an application, and the address information includes a source IP address, a source port number, a destination IP address, and a destination port number, a selection unit 402 configured to select, from the plurality of data flows based on the source IP address of each data flow, a data flow set that is generated when a first client device accesses the plurality of services, where the first client device is a client device in the plurality of client devices that is allocated to use a first IP address, and a determining unit 403 configured to determine, based on a destination IP address and a destination port number of each data flow in the data flow set, a service set accessed by the first client device, where the service set includes a first service and a second service, and a combination of a destination IP address and a destination port number that correspond to the first service is different from a combination of a destination IP address and a destination port number that correspond to the second service. The determining unit 403 is further configured to determine a correlation between services in the service set based on time information of each data flow in the data flow set. The determining unit 403 is further configured to determine, based on the correlation, that the first service and the second service are used to implement a first application. The determining unit 403 is further configured to determine that data flows corresponding to the first service and the second service are data flows of the first application.

The determining unit 403 is further configured to perform clustering based on the correlation by using an unsupervised learning algorithm, to determine that the first service and the second service are used to implement the first application.

The determining unit 403 is further configured to determine a first co-occurrence service set based on the time information of each data flow in the data flow set, where the first service and the second service belong to the first co-occurrence service set, the first co-occurrence service set includes at least two services, and interval duration of time information of data flows generated when the at least two services are accessed is less than or equal to preset duration, and determine a correlation between the first service and the second service based on the first co-occurrence service set.

The determining unit 403 is further configured to determine a similarity between the first service and the second service based on the first co-occurrence service set, to obtain a similarity matrix. The determining unit 403 is further configured to determine, based on the similarity matrix, that the first service and the second service are used to implement the first application.

The determining unit 403 is further configured to determine the similarity between the first service and the second service based on a cosine similarity calculation method, an intersection over union calculation method, or a Euclidean distance calculation method.

The device further includes an extraction unit 404 configured to extract a first feature vector of the first service and a second feature vector of the second service from the similarity matrix by using a graph embedding technology. The determining unit 403 is further configured to determine, based on the first feature vector and the second feature vector, that the first service and the second service are used to implement the first application.

The extraction unit 404 is further configured to extract DNS features of the plurality of data flows, where the DNS feature includes a correspondence between a domain name, and the combination of the destination IP address and the destination port number. The determining unit 403 is further configured to determine a label of the first application based on destination address information of the data flow of the first application and the DNS features, where the label is used to identify the first application.

In addition, functional units in the embodiment shown in FIG. 4 may be integrated into one processing unit, or each of the units may exist alone physically, or two or more units are integrated into one unit. The foregoing units may be implemented in a form of hardware, or may be implemented in a form of a software functional unit. Alternatively, some units may be implemented in a form of hardware, and other units are implemented in a form of a software functional unit.

When the units are implemented in a form of the software functional unit and sold or used as independent products, the integrated unit may be stored in a computer-readable storage medium. Based on such an understanding, a technical solution of this application essentially, or a part contributing to the conventional technology, or all or some of the technical solution may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, for example, a Universal Serial Bus (USB) flash drive, a removable hard disk, a read-only memory (ROM), a random-access memory (RAM), a magnetic disk, or an optical disc.

For more details about a process in which the packet forwarding device shown in FIG. 4 classifies the data flows, refer to the descriptions in the related method embodiments in FIG. 2 and FIG. 3. Details are not described herein again.

Figure 5:
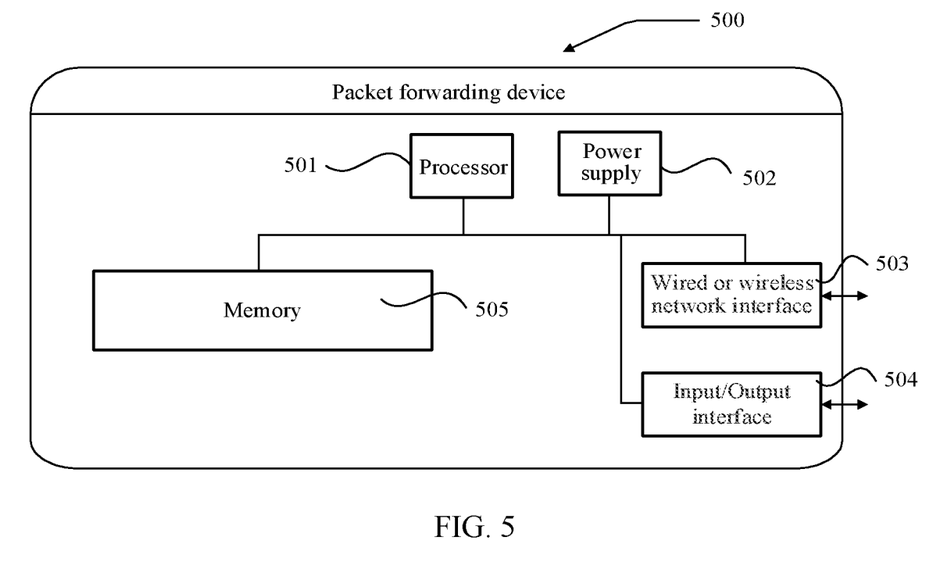
FIG. 5 is another schematic diagram of an embodiment of a packet forwarding according to embodiments of this application.

FIG. 5 is another schematic diagram of an embodiment of a packet forwarding device according to the embodiments of this application. The packet forwarding device provided in this embodiment is used between an internal network and an internet. The packet forwarding device may be a router, a gateway, or the like. A specific device form of the packet forwarding device is not limited in this embodiment of this application.

The packet forwarding device 500 may vary greatly with different configuration or performance, and may include one or more processors 501 and one or more memories 505. The memory 505 stores a program or data.

The memory 505 may be a volatile memory or a non-volatile memory. Optionally, the processor 501 is one or more central processing units (CPUs). The CPU may be a single-core CPU, or may be a multi-core CPU. The processor 501 may communicate with the memory 505, and execute, on the packet forwarding device 500, a series of instructions in the memory 505.

Alternatively, the processor 501 may be an application-specific integrated circuit (ASIC) or a field-programmable gate array (FPGA) array. It may be understood that, if the processor 501 is an ASIC chip or the like that can store instructions, the memory 505 may not exist.

Optionally, the packet forwarding device 500 further includes one or more power supplies 502, one or more wired or wireless network interfaces 503, for example, an Ethernet interface or Ethernet interfaces, and one or more input/output interfaces 504. The input/output interface 504 may be configured to connect to a display, a mouse, a keyboard, a touchscreen device, a sensing device, or the like. The input/output interface 504 is an optional component, and may exist or may not exist. This is not limited herein.

For a procedure executed by the processor 501 in the packet forwarding device 500 in this embodiment, refer to the method procedure described in the foregoing method embodiments. Details are not described herein again.

It may be clearly understood by a person skilled in the art that, for the purpose of convenient and brief description, for a detailed working process of the foregoing apparatus and unit, refer to a corresponding process in the foregoing method embodiments. Details are not described herein again.

In the embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or may not be performed. In addition, the displayed or discussed mutual coupling or direct coupling or communication connection may be implemented through some interfaces. Indirect coupling or communication connection between the apparatuses or units may be implemented in electrical, mechanical, or other forms.

Units described as separate parts may or may not be physically separate, and parts displayed as units may or may not be physical units, may be located in one position, or may be distributed on a plurality of network units. Some or all of the units may be selected based on an actual requirement to achieve an objective of the solutions of the embodiments.

In conclusion, the foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments, or make equivalent replacements to some technical features thereof, without departing from the scope of the technical solutions of the embodiments of the present disclosure.

What is claimed is:

1. A data flow classification method, comprising:
obtaining a plurality of data flows;
extracting address information and time information of each of the plurality of data flows, wherein the plurality of data flows are generated when a plurality of client devices access a plurality of services separately, wherein each of the services is used to implement a sub-function of an application, and wherein the address information comprises a source Internet Protocol (IP) address, a source port number, a destination IP address, and a destination port number;
selecting, from the plurality of data flows based on the source IP address of each of the plurality of data flows, a data flow set that is generated when a first client device accesses the plurality of services, wherein the first client device is a client device in the plurality of client devices that is allocated to use a first IP address;
determining, based on a destination IP address and a destination port number of each of a plurality of data flows in the data flow set, a service set accessed by the first client device, wherein the service set comprises a first service and a second service, and a combination of a destination IP address and a destination port number that correspond to the first service is different from a combination of a destination IP address and a destination port number that correspond to the second service;
determining, a correlation between services in the service set based on time information of each of the data flows in the data flow set;
determining, based on the correlation, that the first service and the second service are used to implement a first application; and
determining, that data flows corresponding to the first service and the second service are data flows of the first application.

2. The data flow classification method of claim 1, wherein the time information comprises at least one of a start moment of the data flow or an end moment of the data flow.

3. The data flow classification method of claim 1, wherein determining, based on the correlation, that the first service and the second service are used to implement a first application further comprises performing clustering based on the correlation using an unsupervised learning algorithm, to determine that the first service and the second service are used to implement the first application.

4. The data flow classification method of claim 3, wherein a method for the clustering comprises a spectral clustering algorithm, a K-Means clustering algorithm, or a density-based spatial clustering of applications with noise (DB-SCAN) density clustering algorithm.

5. The data flow classification method of claim 1, wherein determining a correlation between services in the service set based on time information of each of the data flows in the data flow set comprises:
determining a first co-occurrence service set based on the time information of each of the data flows in the data flow set, wherein the first service and the second service belong to the first co-occurrence service set, wherein the first co-occurrence service set comprises at least two services, and wherein an interval duration of time information of data flows generated when the at least two services are accessed is less than or equal to preset duration; and
determining a correlation between the first service and the second service based on the first co-occurrence service set.

6. The data flow classification method of claim 5, further comprising:
determining a similarity between the first service and the second service based on the first co-occurrence service set, to obtain a similarity matrix; and
determining, based on the correlation, that the first service and the second service are used to implement a first application comprises determining, based on the similarity matrix, that the first service and the second service are used to implement the first application.

7. The data flow classification method of claim 6, wherein determining, by the packet forwarding device, a similarity between the first service and the second service based on the first co-occurrence service set comprises determining the similarity between the first service and the second service based on a cosine similarity calculation method, an intersection over union calculation method, or a Euclidean distance calculation method.

8. The data flow classification method of claim 6, further comprising:
extracting a first feature vector of the first service and a second feature vector of the second service from the similarity matrix using a graph embedding technology; and
determining, based on the correlation, that the first service and the second service are used to implement a first application comprises determining, based on the first feature vector and the second feature vector, that the first service and the second service are used to implement the first application.

9. The data flow classification method of claim 1, further comprising:
extracting Domain Name System (DNS) features of the plurality of data flows, wherein each of the DNS features comprises a correspondence between a domain name, and the combination of the destination IP address and the destination port number; and
determining a label of the first application based on destination address information of the data flow of the first application and the DNS features, wherein the label is used to identify the first application.

10. A packet forwarding device, comprising:
a network interface configured to receive and send data; and
a processor coupled to the network interface and configured to:
obtain a plurality of data flows;
extract address information and time information of each of the plurality of data flows, wherein the plurality of data flows are generated when a plurality of client devices access a plurality of services separately, wherein each of the services is used to implement a sub-function of an application, and wherein the address information comprises a source Internet Protocol (IP) address, a source port number, a destination IP address, and a destination port number;

select, from the plurality of data flows based on the source IP address of each of the plurality of data flows, a data flow set that is generated when a first client device accesses the plurality of services, wherein the first client device is a client device in the plurality of client devices that is allocated to use a first IP address;

determine, based on a destination IP address and a destination port number of each of the plurality of data flows in the data flow set, a service set accessed by the first client device, wherein the service set comprises a first service and a second service, and a combination of a destination IP address and a destination port number that correspond to the first service is different from a combination of a destination IP address and a destination port number that correspond to the second service;

determine a correlation between services in the service set based on time information of each of a plurality of data flows in the data flow set;

determine, based on the correlation, that the first service and the second service are used to implement a first application; and determine that data flows corresponding to the first service and the second service are data flows of the first application.

11. The packet forwarding device of claim 10, wherein the time information comprises at least one of a start moment of the data flow or an end moment of the data flow.

12. The packet forwarding device of claim 10, wherein the processor is configured to determine, based on the correlation, that the first service and the second service are used to implement a first application by performing clustering based on the correlation using an unsupervised learning algorithm to determine that the first service and the second service are used to implement the first application.

13. The packet forwarding device of claim 12, wherein the unsupervised learning algorithm comprises a spectral clustering algorithm, a K-Means clustering algorithm, or a density-based spatial clustering of applications with noise (DBSCAN) density clustering algorithm.

14. The packet forwarding device of claim 10, wherein the processor is configured to determine the correlation between services in the service set based on time information of each of a plurality of data flows in the data flow set by:

determining a first co-occurrence service set based on the time information of each of the plurality of data flows in the data flow set, wherein the first service and the second service belong to the first co-occurrence service set, the first co-occurrence service set comprises at least two services, and interval duration of time information of data flows generated when the at least two services are accessed is less than or equal to preset duration; and determining a correlation between the first service and the second service based on the first co-occurrence service set.

15. The packet forwarding device of claim 14, wherein the processor is further configured to:

determine a similarity between the first service and the second service based on the first co-occurrence service set, to obtain a similarity matrix; and determine, based on the correlation, that the first service and the second service are used to implement a first application by determining, based on the similarity matrix, that the first service and the second service are used to implement the first application.

16. The packet forwarding device as claimed in claim 15, wherein the processor is configured to determine the similarity between the first service and the second service based on the first co-occurrence service set by determining the similarity between the first service and the second service based on a cosine similarity calculation method, an intersection over union calculation method, or a Euclidean distance calculation method.

17. The packet forwarding device of claim 15, wherein the processor is further configured to:

extract a first feature vector of the first service and a second feature vector of the second service from the similarity matrix using a graph embedding technology; and determine, based on the correlation, that the first service and the second service are used to implement a first application by determining, based on the first feature vector and the second feature vector, that the first service and the second service are used to implement the first application.

18. The packet forwarding device of claim 10, wherein the processor is further configured to:

extract Domain Name System (DNS) features of the plurality of data flows, wherein each of the DNS features comprises a correspondence between a domain name, and the combination of the destination IP address and the destination port number; and determine a label of the first application based on destination address information of the data flow of the first application and the DNS features, wherein the label is used to identify the first application.

19. A non-transitory computer-readable storage medium configured to store instructions; and that when executed by one or more processors causes a packet forwarding device to:

obtain a plurality of data flows;

extract address information and time information of each of the plurality of data flows, wherein the plurality of data flows are generated when a plurality of client devices access a plurality of services separately, wherein each of the services is used to implement a sub-function of an application, and wherein the address information comprises a source Internet Protocol (IP) address, a source port number, a destination IP address, and a destination port number;

select, from the plurality of data flows based on the source IP address of each of the plurality of data flows, a data flow set that is generated when a first client device accesses the plurality of services, wherein the first client device is a client device in the plurality of client devices that is allocated to use a first IP address;

determine, based on a destination IP address and a destination port number of each of the plurality of data flows in the data flow set, a service set accessed by the first client device, wherein the service set comprises a first service and a second service, and a combination of a destination IP address and a destination port number that correspond to the first service is different from a combination of a destination IP address and a destination port number that correspond to the second service;

determine a correlation between services in the service set based on time information of each of the plurality of data flows in the data flow set;

determine, based on the correlation, that the first service and the second service are used to implement a first application; and determine that data flows corresponding to the first service and the second service are data flows of the first application.

20. The non-transitory computer-readable storage medium of claim 19, wherein the time information comprises at least one of a start moment of the data flow or an end moment of the data flow.

* * * * *

UNITED STATES PATENT AND TRADEMARK OFFICE
CERTIFICATE OF CORRECTION

PATENT NO. : 12,003,609 B2  
APPLICATION NO. : 17/468250  
DATED : June 4, 2024  
INVENTOR(S) : Yaping Qiu et al.

Page 1 of 1

It is certified that error appears in the above-identified patent and that said Letters Patent is hereby corrected as shown below:

In the Claims

Claim 1, Column 19, Line 40: "determining, a" should read "determining a"

Claim 1, Column 19, Line 46: "determining, that" should read "determining that"

Signed and Sealed this  
Sixth Day of August, 2024

Katherine Kelly Vidal  
*Director of the United States Patent and Trademark Office*